(No Model.)
J. A. PRICE & D. WRIGHT.
FURNACE GRATE.
No. 293,274. Patented Feb. 12, 1884.
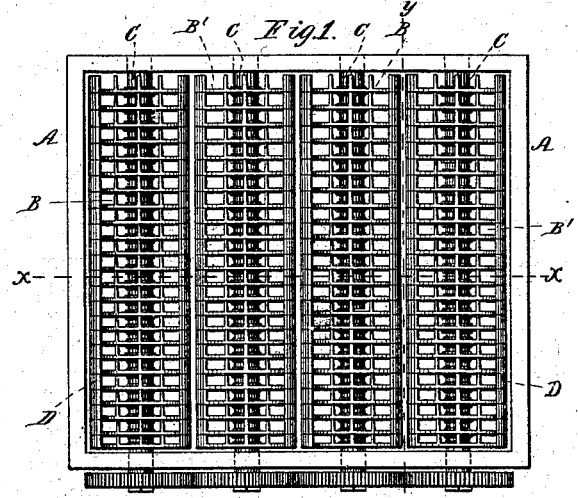
Fig. 1.
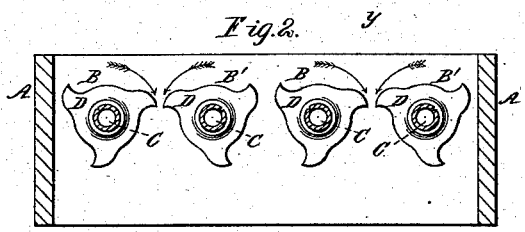
Fig. 2.
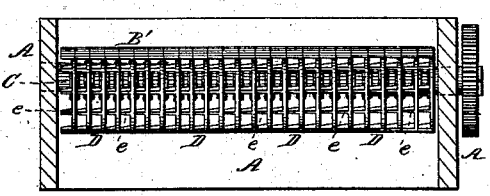
Fig. 3.
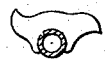
Fig. 4.
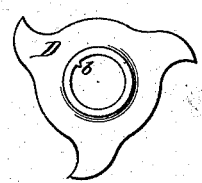
Witnesses:
W. C. Jordiston
J. B. Church
Inventors:
John A. Price
Duncan Wright
by
Melville Church
their Attorney.

UNITED STATES PATENT OFFICE.

JOHN A. PRICE AND DUNCAN WRIGHT, OF SCRANTON, PENNSYLVANIA, SAID WRIGHT ASSIGNOR TO SAID PRICE.

FURNACE-GRATE.

SPECIFICATION forming part of Letters Patent No. 293,274, dated February 12, 1884.

Application filed August 23, 1883. (No model.)

*To all whom it may concern:*

Be it known that we, JOHN A. PRICE and DUNCAN WRIGHT, of Scranton, in the county of Lackawanna and State of Pennsylvania, have invented certain new and useful Improvements in Furnace-Grates; and we do hereby declare the following to be a full, clear, and exact description of the same, reference being had to the accompanying drawings and to the figures and letters of reference marked thereon.

Our invention relates to that class of grates which are composed of sections mounted upon revolving shafts and constructed so as to support the fuel normally, and when turned operate to cut out the ashes and clinkers from the fire and present new fire-supporting surfaces similar in form to those displaced. The patent granted to William McClave, March 25, 1879, No. 213,516, and the patent to McClave and Price, January 10, 1882, No. 252,049, show the type of grate referred to. In the patent to McClave each section of the grate is shown consisting of a shaft carrying curved projecting arms formed with or otherwise secured upon the shaft, and serving to support the fuel and furnish the means for cutting out the ashes and cinders from the fire without allowing the coals to fall into the ash-pit beneath.

The chief difficulty experienced with grates of this class as heretofore constructed has arisen from the warping or bending of the shafts of the sections. This warping is not so marked where the shafts are short, as in stoves and small furnaces; but where they are made of considerable length, as is necessary to adapt them to large furnaces, great care has to be exercised to prevent their warping to such a degree as to render them inoperative.

Our present invention has for its primary object to prevent the warpage of the shafts; and to this end it consists, first, in constructing the shafts of tubular metal—ordinary gas-pipe, for instance—and in affixing the several arms or bars forming the fire-support to said tubular shaft, all as will be hereinafter fully explained.

The second part of our invention has for its object to increase the amount of grated surface in each grate-section; and to this end it consists in providing the several arms or bars of which each section is composed with lateral arms or projections in such manner as to form a grated space between the arms or bars of the section, instead of an open space extending clear around, as in the patents referred to.

There are certain other detailed improvements embodied in our present invention, which will be hereinafter fully described and made the subject of claims at the end of this specification.

Referring to the accompanying drawings, Figure 1 represents a top plan view of a furnace-grate constructed in accordance with our invention. Fig. 2 is a sectional view taken on the line $x\ x$ of Fig. 1. Fig. 3 is a sectional view taken on the line $y\ y$ of Fig. 1. Fig. 4 is a view of a modification of the invention.

Similar letters of reference in the several figures denote the same parts.

A represents the casing of the furnace; B B', the several sections of which the grate is composed. Each section consists of a tubular section, C, constructed, preferably, of ordinary gas-pipe, having open ends and suitably journaled in the walls of the casing. Upon this tubular shaft are secured, in any suitable way, the fire-supporting arms or bars D. By preference we form a longitudinal groove, $c$, in the outside of each shaft, and form upon each section B a rib or tongue, $b$, which is adapted to enter the groove in the shaft and hold the sections locked to the shaft. The tubular form of the shaft combines great strength with lightness, and both ends of it being open a free circulation of air is kept up through it, and it is prevented effectually from being warped by the heat to which it is subjected. In order to increase the circulation of air through the shafts we arrange them at a slight inclination, as shown in Fig. 3, so that the tendency of the heated air within them will be to rise to the higher end, and its place be supplied by cool air entering the lower ends. Each of the fire-supporting bars of the sections is preferably provided with three fire-supporting surfaces, terminating in cutting-points, as shown in the patent of McClave referred to; and it is further provided with lateral projections or fingers *e e*, as shown in Fig. 3. In applying the arms or bars to the shafts they are slipped longitudinally upon the shaft one after another and brought together, so that the ends of the lateral fingers of one will abut against the plain flat side of the next adjoining one. In this way the lateral projections or fingers serve the double purpose of spacing the bars on the shaft and holding them in their proper relation and of grating the space between the bars, instead of leaving the same open clear around, as in the patents referred to, and thereby enabling finer fuel to be supported.

The several sections of which the grate is composed are adapted to operate in pairs—that is to say, each section B co-operates with the next adjoining section B', and each time the shafts are revolved a third of a revolution in the direction indicated by the arrows, Fig. 2, the cutting-edges of the supporting-surface which is uppermost cuts through the fire and removes the ashes and cinders therefrom and dumps them into the ash-pit below, the next succeeding supporting-surface the while rising into position and supporting the superincumbent mass, as before.

Any appropriate means may be employed for imparting rotary motion to the sections; but we preferably secure suitable gears upon the extended ends of the tubular shafts and communicate simultaneous motion to each pair of sections by means such as shown in the McClave and Price patent referred to, or by any other suitable means.

The lateral fingers may be applied to other forms of fire-supporting arms or bars without departing from the principle of our invention in that regard.

The tubular shaft and the lateral projecting fingers of the fire-supporting bars may be used in connection with other forms of fire-supporting bars—as, for instance, with the other form of bars shown in Fig. 4, wherein the bars have but one fire-supporting surface, and the section is adapted to be rocked instead of rotated, as in the construction shown in the other figures.

Having thus described our invention, we claim as new—

1. A cutting and dumping grate having its fire-supporting arms or bars mounted upon shafts made tubular for the free circulation of air through them, whereby the sections are rendered light and strong and prevented from warping under the action of the heat, substantially as described.

2. In a cutting and dumping grate, the combination of the hollow supporting-shafts, open at both ends, and having the longitudinal groove, in combination with the independent fire-supporting arms or bars adapted to be slipped upon the tubular shaft, and provided with the projections or tongues for preventing their rotation independent of the shaft, substantially as described.

3. The fire-supporting bars or arms of the grate-sections, having the lateral projections or fingers, which serve to grate the space between the bars or arms, substantially as described.

4. In a cutting and dumping grate, the combination of the fire-supporting arms or bars and the hollow open shafts on which said bars or arms are separately mounted arranged in inclined position, substantially as described, for the purpose specified.

5. The combination of the hollow shafts and the fire-supporting arms or bars mounted thereon, having the lateral projections or fingers, which serve to space the arms from each other, and also to grate the space between the arms, substantially as described, for the purpose specified.

6. The combination of the hollow tubular shafts with the series of independent removable fire-supporting bars or arms mounted thereon, substantially as described.

JOHN A. PRICE.
DUNCAN WRIGHT.

Witnesses:
A. C. FULLER,
CHAS. SCHIEBER.